(12) United States Patent
Iki et al.

(10) Patent No.: US 10,811,944 B2
(45) Date of Patent: Oct. 20, 2020

(54) STATOR OF ELECTRIC ROTARY MACHINE

(71) Applicant: HONDA MOTOR CO., LTD., Tokyo (JP)

(72) Inventors: Tomotaka Iki, Saitama (JP); Fumiya Nishii, Saitama (JP); Koji Kawanami, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/269,708

(22) Filed: Feb. 7, 2019

(65) Prior Publication Data

US 2019/0260275 A1 Aug. 22, 2019

(30) Foreign Application Priority Data

Feb. 20, 2018 (JP) .................................. 2018-028217

(51) Int. Cl.
| | |
|---|---|
| *H02K 15/00* | (2006.01) |
| *H02K 1/16* | (2006.01) |
| *H02K 3/12* | (2006.01) |
| *B23K 26/24* | (2014.01) |
| *B23K 26/32* | (2014.01) |

(Continued)

(52) U.S. Cl.
CPC ......... *H02K 15/0081* (2013.01); *B23K 26/24* (2013.01); *B23K 26/242* (2015.10); *B23K 26/32* (2013.01); *H02K 1/16* (2013.01); *H02K 3/12* (2013.01); *B23K 2101/36* (2018.08); *B23K 2101/38* (2018.08); *B23K 2103/12* (2018.08)

(58) Field of Classification Search
CPC ............. H02K 1/16; H02K 3/16; H02K 15/02

USPC .......................................... 310/208, 201–203
See application file for complete search history.

(56) References Cited

U.S. PATENT DOCUMENTS 6,208,058 B1 * 3/2001 Taji .......................... H02K 3/12
310/108
6,459,177 B1 * 10/2002 Nakamura ............... H02K 3/12
310/201

(Continued)

FOREIGN PATENT DOCUMENTS

| CN | 104584392 A | 4/2015 |
|---|---|---|
| JP | 2000-262021 A | 9/2000 |

(Continued)

OTHER PUBLICATIONS

Machine Translation JP2015109718 (Year: 2015).*

(Continued)

*Primary Examiner* — Jose A Gonzalez Quinones
(74) *Attorney, Agent, or Firm* — Paratus Law Group, PLLC

(57) ABSTRACT

A stator of an electric rotary machine includes: a stator core; and a coil including a plurality of first coil segments and a plurality of second coil segments. An end part of the projection part of the first coil segment is joined with an end part of the projection part of the second coil segment through laser welding in a state of abutting to the end part of the projection part of the second coil segment. And abutting portions abutting to each other between the projection part of the first coil segment and the projection part of the second coil segment include joining surfaces joined with each other and engaging surfaces engaged with each other and orthogonal to the joining surfaces.

5 Claims, 8 Drawing Sheets

(51) Int. Cl.
*B23K 26/242* (2014.01)
*B23K 101/36* (2006.01)
*B23K 103/12* (2006.01)
*B23K 101/38* (2006.01)

(56) References Cited

U.S. PATENT DOCUMENTS

| | | |
|---|---|---|
| 10,236,754 B2 * | 3/2019 | Baba ............... H02K 15/0081 |
| 2003/0137207 A1 | 7/2003 | Tamura et al. |
| 2015/0222155 A1 | 8/2015 | Nakayama et al. |
| 2017/0187271 A1 | 6/2017 | Sekikawa et al. |

FOREIGN PATENT DOCUMENTS

| | | | |
|---|---|---|---|
| JP | 2003-125564 A | | 4/2003 |
| JP | 2003-219614 A | | 7/2003 |
| JP | 2014-036478 A | | 2/2014 |
| JP | 2015-109718 A | | 6/2015 |
| JP | 2015109718 A | * | 6/2015 |
| JP | 2016-092875 A | | 5/2016 |
| WO | WO 2015/189905 A1 | | 12/2015 |

OTHER PUBLICATIONS

Sep. 24, 2019, Japanese Office Action issued for related JP Application No. 2018-028217.
Aug. 6, 2020, Chinese Office Action issued for related CN application No. 201910125644.6.

* cited by examiner

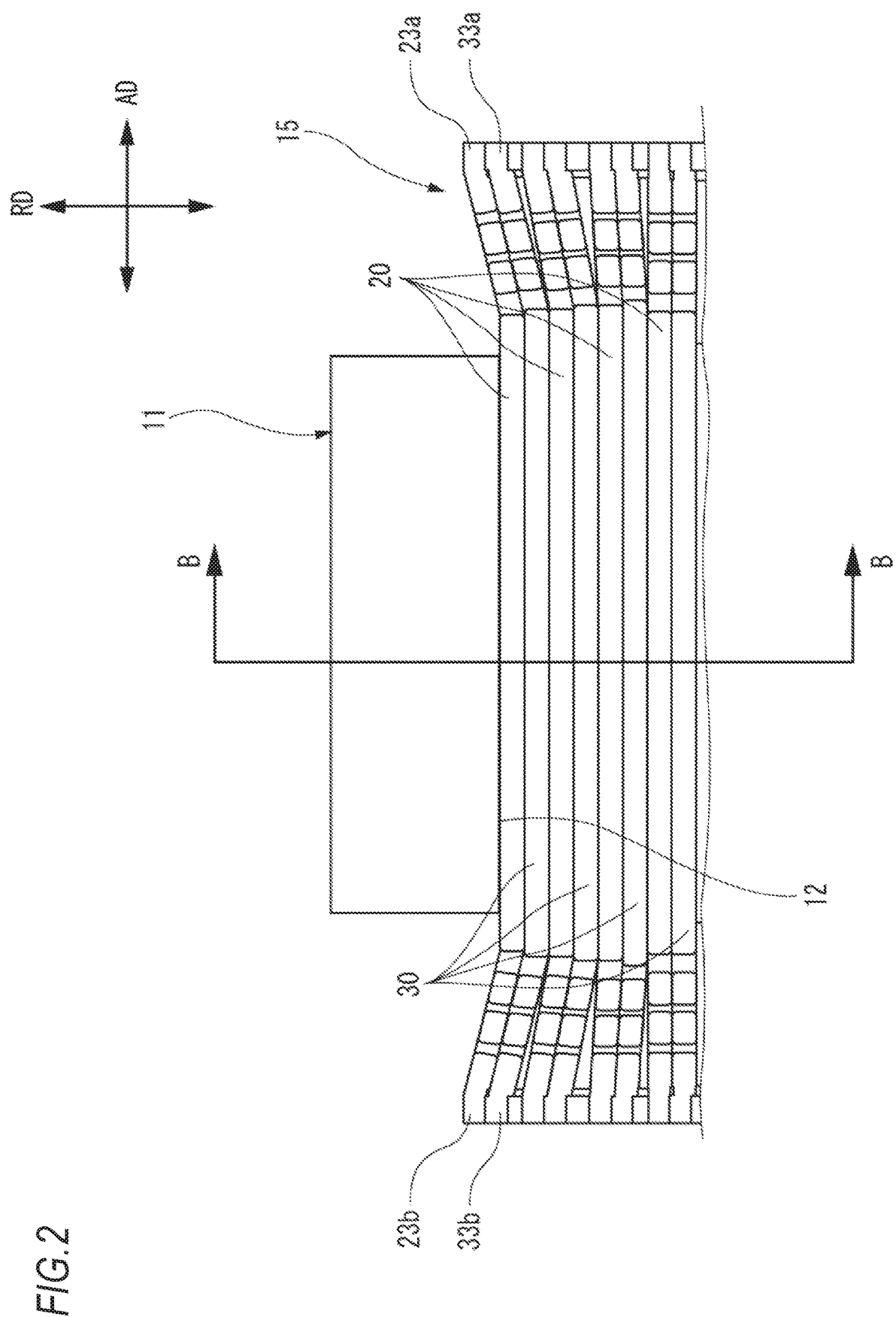

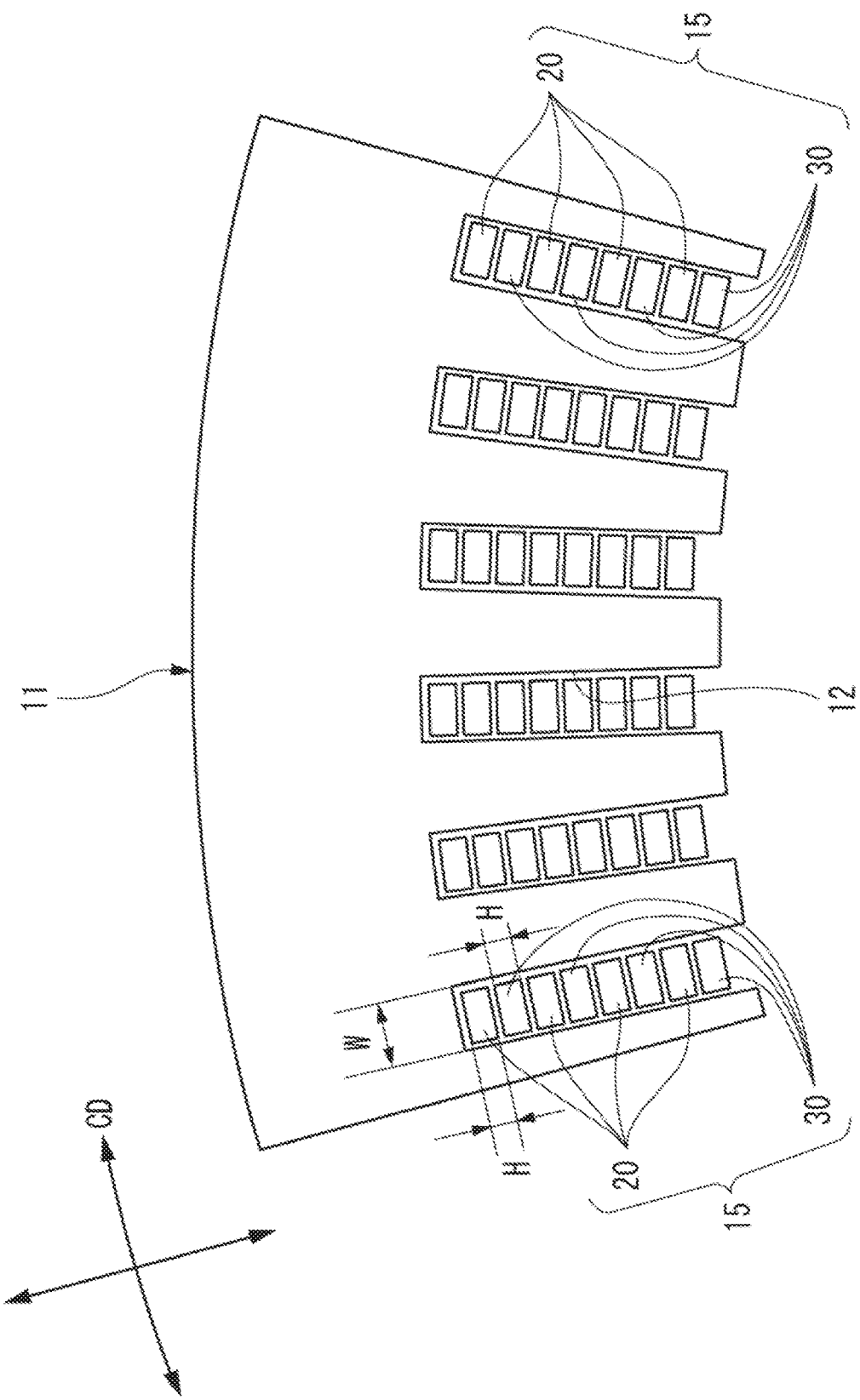

STATOR OF ELECTRIC ROTARY MACHINE

CROSS-REFERENCE TO RELATED APPLICATIONS

This application is based on and claims priority under 35 USC 119 from Japanese Patent Application No. 2018-028217 filed on Feb. 20, 2018, the contents of which are incorporated herein by reference.

TECHNICAL FIELD

The present invention relates to a stator of an electric rotary machine which is mounted on an electric vehicle, a hybrid vehicle, or the like.

BACKGROUND ART

A stator of an electric rotary machine is known which includes a stator core and a coil including a winding wound around the teeth of the stator core. Since the winding is wound with insulating paper interposed therein in the stator of the winding method, the winding processing is complicated, and the shaping of the winding is difficult.

In this regard, in Japanese Patent Application Laid-Open Publication No. 2003-125564, a coil manufacturing method of an electric rotary machine is proposed in which a conducting wire at a tip portion of a coil segment inserted into a stator core is held by a groove of a ring-shaped holding tool, and the holding tool is rotated such that the conducting wire of the coil segment is bent into a predetermined shape, and the end parts of the coil segments are welded to each other.

In Japanese Patent Application Laid-Open Publication No. 2003-219614, a winding joining method of an electric rotary machine is proposed in which joint end parts are TIG-welded in a state where the movement of the joint end part of each electric conductor is restrained.

However, in the winding joining method of the electric rotary machine described in Japanese Patent Application Laid-Open Publication No. 2003-125564 and Japanese Patent Application Laid-Open Publication No. 2003-219614, it is necessary to secure a sufficient distance from the film peeling portion, thereby increasing the cross-over. Instead of TIG welding, a method is considered that the end parts of two electric conductors abut to each other, and in that state, the abutting portion is laser welded with a laser beam.

The laser welding requires high output in joining the end parts of the electric conductor to each other. However, since the operation time is short, the heat rise in the electric conductor is suppressed and it is possible to reduce the cross-over.

However, when the end parts of two electric conductors are laser-welded with a laser beam, the laser beam passes through between the end parts, so that the insulating film of another conductor or the like may be damaged.

The invention has been made in consideration of the above situation, and is to provide a stator of an electric rotary machine in which end parts of an electric conductor joined through laser welding can abut to each other reliably, and members can be prevented from being damaged by a laser beam used in the welding.

SUMMARY OF INVENTION

A stator of an electric rotary machine related to the invention includes:

a stator core;

a coil including a plurality of coil segments which are inserted into each of plural slots formed in the stator core and project from the plural slots to an outside in an axial direction of the stator core, in which the plurality of coil segments include a plurality of first coil segments and a plurality of second coil segments, the first coil segment includes an insertion part inserted into the slot and a projection part which projects to the outside in the axial direction compared to an end surface in the axial direction of the stator core, the second coil segment includes an insertion part inserted into the slot and a projection part which projects to the outside in the axial direction compared to the end surface, an end part of the projection part of the first coil segment is joined with an end part of the projection part of the second coil segment through laser welding in a state of abutting to the end part of the projection part of the second coil segment, and abutting portions abutting to each other between the projection part of the first coil segment and the projection part of the second coil segment include joining surfaces joined with each other and engaging surfaces engaged with each other and orthogonal to the joining surfaces.

According to the invention, the abutting portions abutting to each other between the projection part of the first coil segment and the projection part of the second coil segment include the joining surfaces to be joined with each other and the engaging surfaces to be engaged with each other and orthogonal to the joining surfaces. Thus, the first coil segment and the second coil segment can be joined in the positioned state. In addition, the engaging surface of any one of the first coil segment and the second coil segment functions as a retaining part of a laser beam at the time of laser welding the joining surfaces. Therefore, it is possible to avoid the adverse effect of the laser beam on other parts

BRIEF DESCRIPTION OF DRAWINGS

FIG. 2 is a sectional view taken along line A-A of FIG. 1;

FIG. 3 is a sectional view taken along line B-B of FIG. 2;

DETAILED DESCRIPTION

Figure 1:
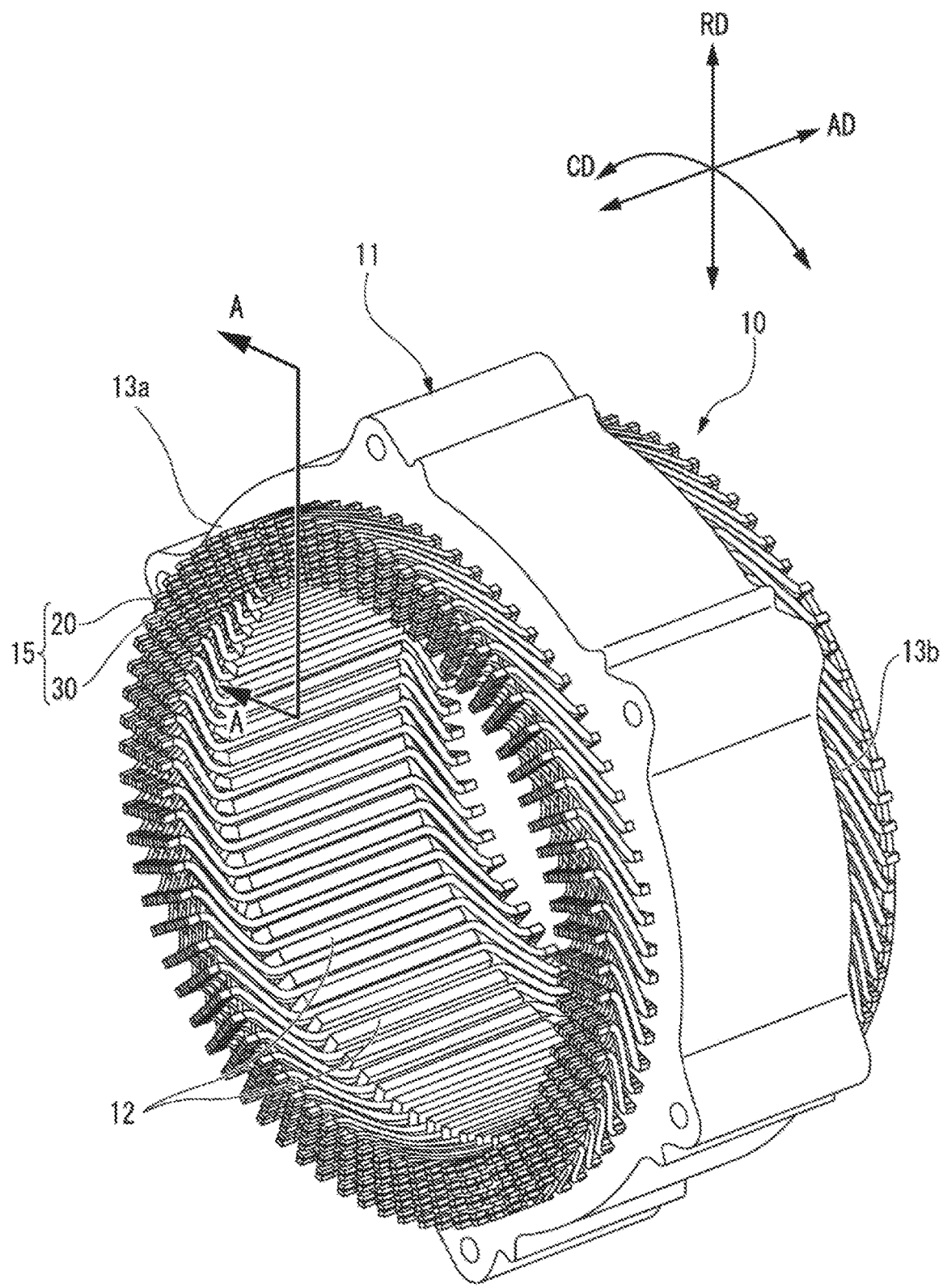
FIG. 1 is a perspective view of a stator of an electric rotary machine of one embodiment of the invention.

Hereinafter, one embodiment of a stator of an electric rotary machine of the invention will be described with reference to the accompanying drawings. In the drawings, reference numeral RI) indicates a radial direction of the stator, reference numeral AD indicates an axial direction of the stator, and reference numeral CD indicates a circumferential direction of the stator.

As illustrated in FIG. 1, a stator 10 of an electric rotary machine includes a stator core 11 and a coil 15.

For example, the stator core 11 is an annular member formed by stacking a plurality of annular electromagnetic steel plates. The stator core 11 includes a plurality of slots 12 which are arranged at equal intervals along the circumferential direction CD of the stator core 11 in the inner circumferential surface thereof.

The slot 12 is formed of a groove which extends from one end surface 13a in an axial direction AD of the stator core 11 to the other end surface 13h in the axial direction AD of the stator core 11.

The coil 15 includes a plurality of coil segments which are inserted into each of the plural slots 12 formed in the stator core 11 and project from each slot 12 to the outside in the axial direction AD of the stator core 11.

The plurality of coil segments are formed of a plurality of first coil segments 20 and a plurality of second coil segments 30.

As illustrated in FIGS. 2 and 3, total eight coil segments of four first coil segments 20 and four second coil segments 30 are alternately inserted from the outer diameter side of each slot 12 of the stator core 11. That is, four sets of the coil segments including the first coil segments 20 and the second coil segments 30 adjacent to each other are inserted into each slot 12 of the stator core 11.

Figure 4A:
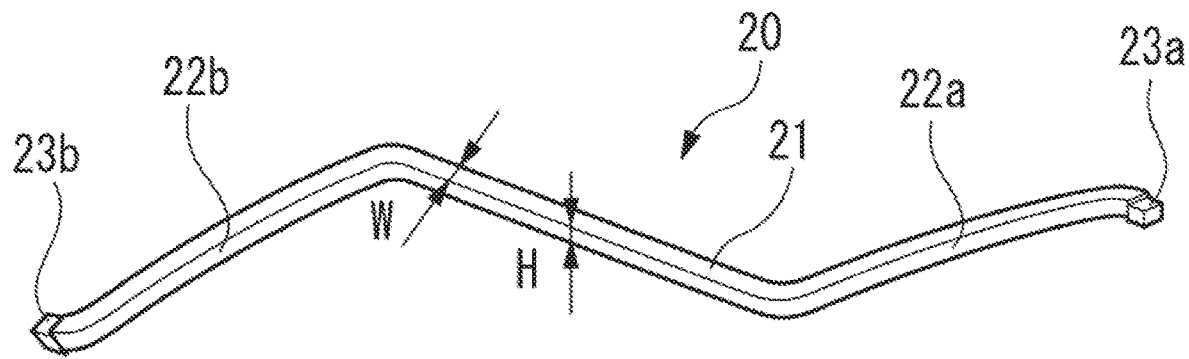
FIG. 4A is a perspective view of a first coil segment in the stator illustrated in FIG. 1.

As illustrated in FIGS. 3 and 4A, for example, the first coil segment 20 is a substantially crank-shaped member which has a substantially rectangular cross section and is formed by wire machining a copper wire. In the cross section of the first coil segment 20, the circumferential width W is larger than the radial width H. The first coil segment 20 is a so-called magnet wire and includes a conductor and an insulating film covering the conductor.

The first coil segment 20 includes a linear insertion part 21 inserted into the slot 12, a first projection part 22a which projects from one end of the insertion part 21 to the outside in the axial direction AD of the stator core 11 compared to the end surface 13a of the stator core 11, and a second projection part 22b which projects from the other end of the insertion part 21 to the outside in the axial direction AD compared to the end surface 13b of the stator core 11.

An end part 23a of the first projection part 22a is bent in a direction intersecting with the extending direction of the first projection part 22a to be substantially parallel to the insertion part 21. The end part 23a of the first projection part 22a is formed in a stepped shape in which the end part is formed to be offset toward the radially outside the stator core 11 through press forming (see FIGS. 6 and 7).

An end part 23b of the second projection part 22b is bent in a direction intersecting with the extending direction of the second projection part 22b to be substantially parallel to the insertion part 21. Similarly to the end part 23a of the first projection part 22a, the end part 23b of the second projection part 22b is formed in a stepped shape in which the end part is formed to be offset toward the radially outside the stator core 11 through press forming (see FIGS. 6 and 7).

Figure 4B:
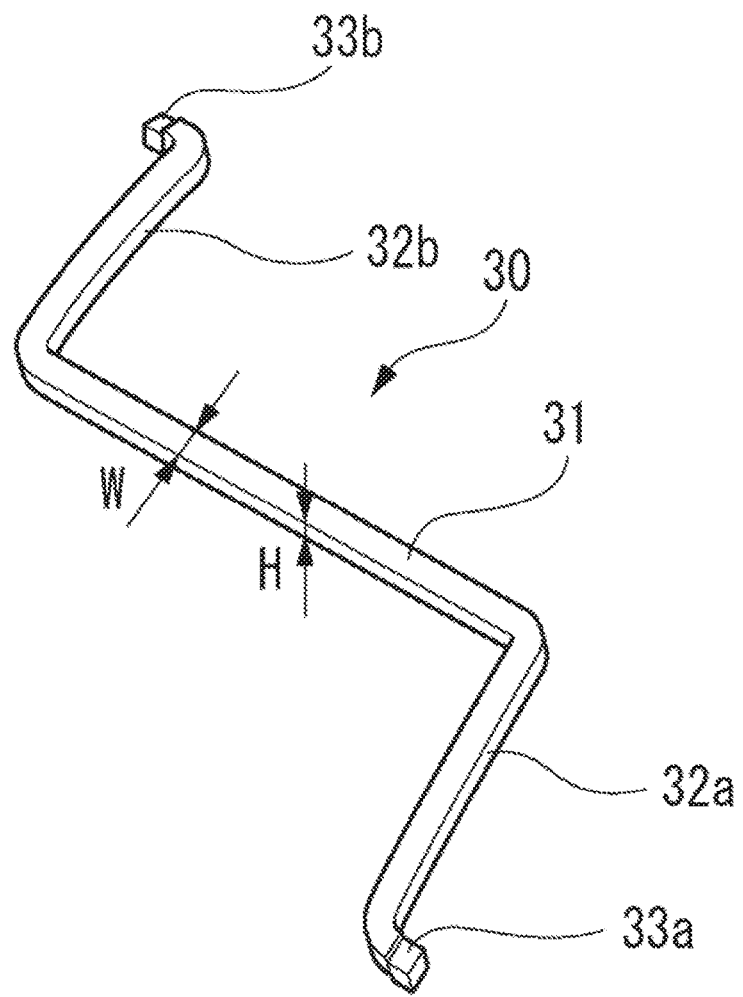
FIG. 4B is a perspective view of a second coil segment in the stator illustrated in FIG. 1.

As illustrated in FIGS. 3 and 4B, for example, the second coil segment 30 is a substantially crank-shaped member which has a substantially rectangular cross section and is formed by wire machining a copper wire. In the cross section of the second coil segment 30, the circumferential width W is larger than the radial width H. The second coil segment 30 is a so-called magnet wire and includes a conductor and an insulating film covering the conductor.

The second coil segment 30 includes an insertion part 31 inserted into the slot 12, a third projection part 32a which projects to the outside in the axial direction AD of the stator core 11 compared to the end surface 13a of the stator core 11, and a fourth projection part 32b which projects to the outside in the axial direction AD compared to the end surface 13b of the stator core 11.

An end part 33a of the third projection part 32a is bent in a direction intersecting with the extending direction of the third projection part 32a to be substantially parallel to the insertion part 31. The end part 33a of the third projection part 32a is formed in a stepped shape in which the end part is formed to be offset toward the radially outside the stator core 11 through press forming (see FIGS. 6 and 7).

An end part 33b of the fourth projection part 32b is bent in a direction intersecting with the extending direction of the fourth projection part 32h to be substantially parallel to the insertion part 31. Similarly to the end part 33a of the third projection part 32a, the end part 33h of the fourth projection part 32h is formed in a stepped shape in which the end part is formed to be offset toward the radially outside the stator core 11 through press forming (see FIGS. 6 and 7).

Figure 5:
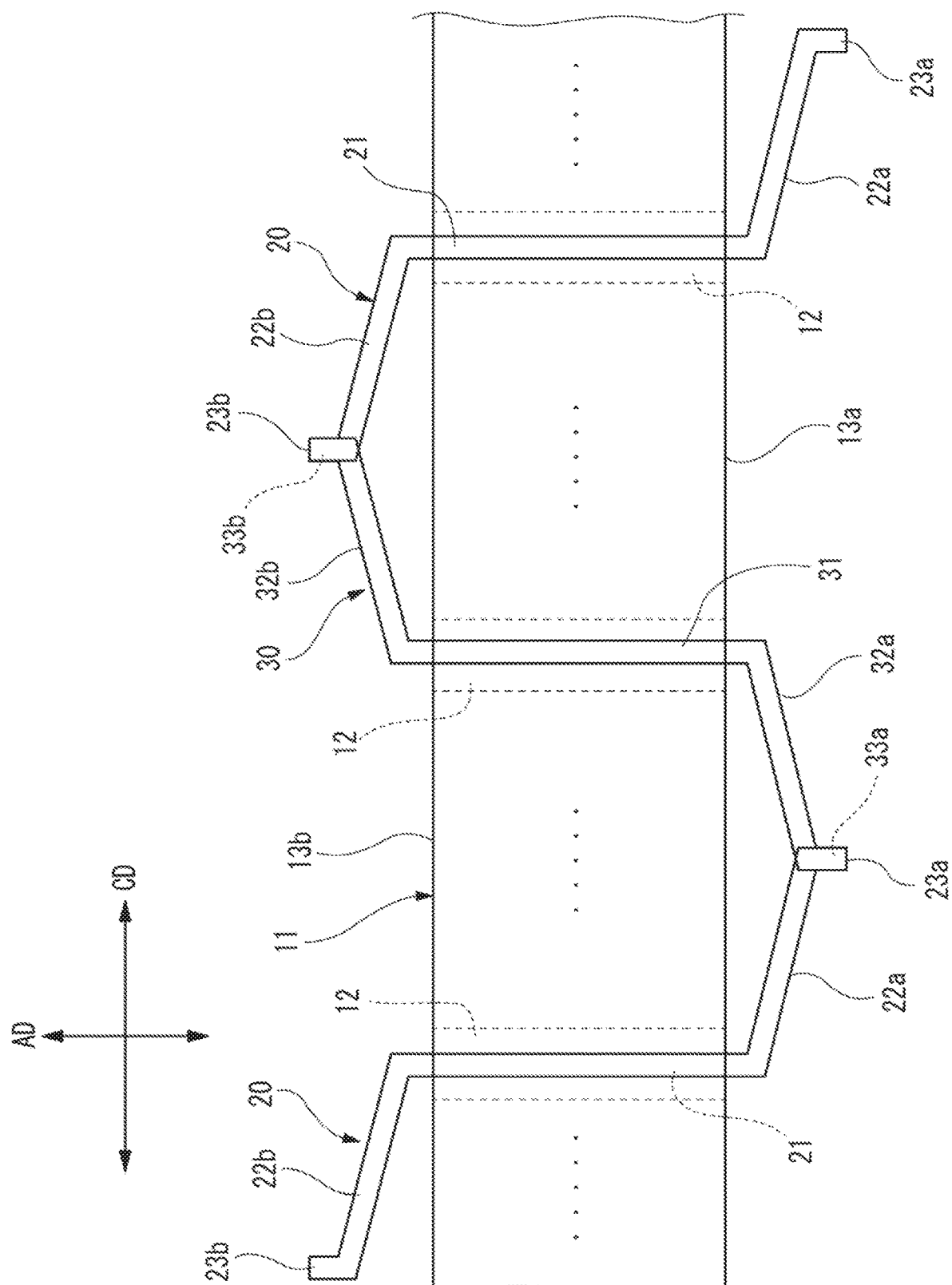
FIG. 5 is a developed view illustrating part of the stator illustrated in FIG. 1 when viewed from the radially outside the stator core.

As illustrated in FIG. 5, the first projection part 22a of the first coil segment 20 of which the insertion part 21 is inserted into the slot 12 extends along the circumferential direction CD of the stator core 11 toward the right direction. The second projection part 22b extends along the circumferential direction CD of the stator core 11 toward the direction (left direction) opposite to the first projection part 22a.

Similarly, the third projection part 32a of the second coil segment 30 of which the insertion part 31 is inserted into the slot 12 extends along the circumferential direction CD of the stator core 11 toward the left direction. The fourth projection part 32b extends along the circumferential direction CD of the stator core 11 toward the direction (right direction) opposite to the third projection part 32a.

In FIG. 5, as for the coil 15, only one second coil segment 30 and two first coil segments 20 electrically connected to the second coil segment 30 are extracted and illustrated for facilitating understanding.

The end part 23a of the first coil segment 20 is joined with the end part 33a of the second coil segment 30 which is inserted into another slot 12 at a position (the position moving clockwise when viewed from the end surface 13a side) separated in one direction along the circumferential direction CD of the stator core 11 from the slot 12 (hereinafter, also referred to as an insertion slot) into which the first coil segment 20 is inserted. Incidentally, the joining indicates that the conductors are electrically connected to each other.

The end part 23b of the first coil segment 20 is joined with the end part 33b of the second coil segment 30 inserted into still another slot 12 at a position (the position moving counterclockwise when viewed from the end surface 13a side) separated from the insertion slot in the other direction along the circumferential direction CD of the stator core 11.

In this way, a coil loop is formed by repeating the joining of the end part 23a of the first coil segment 20 and the end part 33a of the second coil segment 30 and the joining of the end part 23b of the first coil segment 20 and the end part 33b of the second coil segment 30.

The coil 15 includes a plurality of the coil loops, and the plurality of coil loops are selectively connected to form a power line of plural phases (such as a U phase, a V phase, and a W phase).

Figure 6:
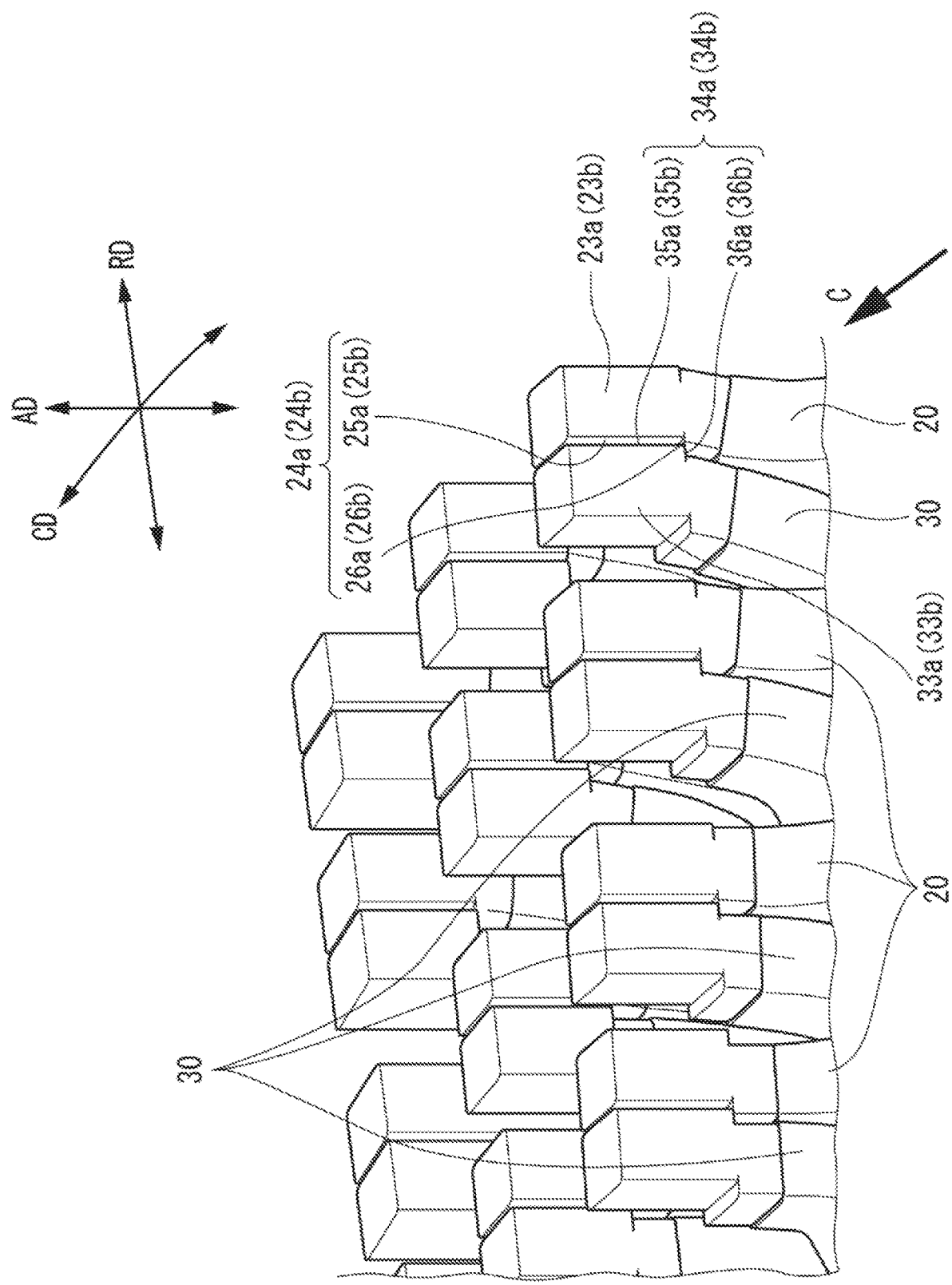
FIG. 6 is a perspective view illustrating a state where end parts of the first coil segment and the second coil segment are joined with each other in the stator illustrated in FIG. 1.
Figure 7:
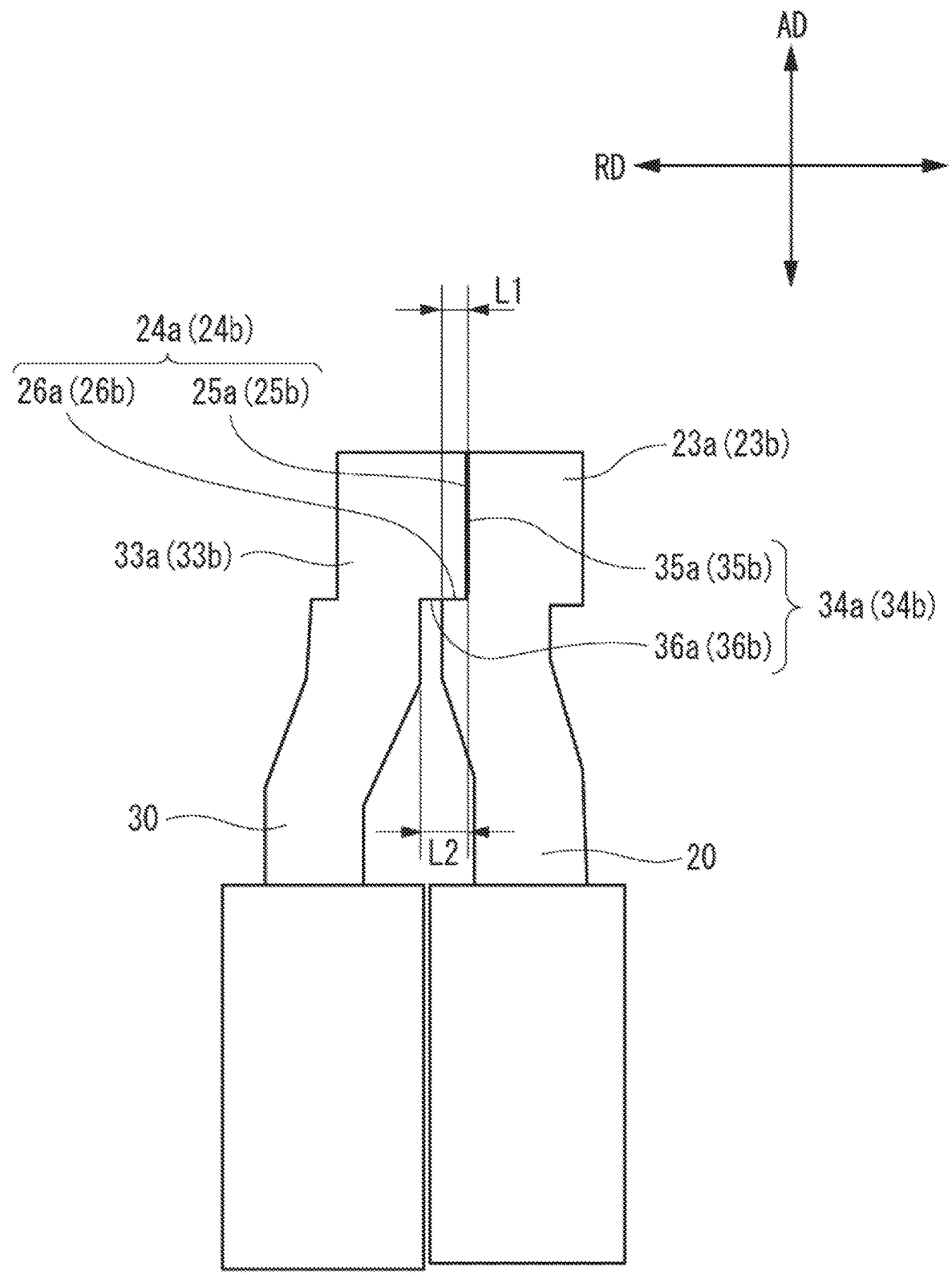
FIG. 7 is a view as seen from a direction of an arrow C in FIG. 6.

As illustrated in FIGS. 6 and 7, the end part 23a of the first coil segment 20 is joined with the end part 33a through laser welding in the state of abutting to the end part 33a of the second coil segment 30.

Incidentally, four sets of coil segments inserted into each slot 12 of the stator core 11 have the same configuration. Thus, the following description will be given about one set of coil segments inserted into each slot 12 on the outer circumferential side. Other three sets of coil segments will not described repeatedly.

Specifically, in the end part 23a of the first coil segment 20 and the end part 33a of the second coil segment 30, the abutting portion 24a of the end part 23a of the first coil segment 20 and the abutting portion 34a of the end part 33a of the second coil segment 30 are overlapped in the radial direction RD of the stator core 11. In that state, the end part 23a and the end part 33a are joined through laser welding in the state where the abutting portions 24a and 34a abut to each other.

Similarly, the end part 23b of the first coil segment 20 is joined with the end part 33b of the second coil segment 30 through laser welding in a state where the abutting portions 24b and 34b abut to each other.

As illustrated in FIGS. 6 and 7, the abutting portion 24a (24b), which abuts to the end part 33a (33b) of the second coil segment 30, in the end part 23a (23b) of the first coil segment 20 includes a joining surface 25a (25b) directed to the radially inside and an engaging surface 26a (26b) orthogonal to the joining surface 25a (25b). The abutting portion 24a (24b) is a recessed portion formed toward the outer diameter side of the stator core 11 and is formed on a surface facing the end part 33a of the second coil segment 30.

The joining surface 25a (25b) is a surface which extends in the circumferential direction CD and the axial direction AD and is joined with a joining surface 35a (35b) of the second coil segment 30 (to be described) through laser welding.

The engaging surface 26a (26b) is a surface, which is orthogonal to the joining surface 25a (25b) and extends in the circumferential direction CD and the radial direction RD of the stator core 11, and is engaged with an engaging surface 36a (36b) of the second coil segment 30 (to be described).

The abutting portion 34a (34b), which abuts to the end part 23a (23b) of the first coil segment 20, in the end part 33a (33b) of the second coil segment 30 includes the joining surface 35a (35b) directed to the radially outside and the engaging surface 36a (36h) orthogonal to the joining surface 35a (35b). The abutting portion 34a (34b) is a convex portion which is formed toward the outer diameter side of the stator core 11 and is formed on a surface facing the end part 23a (23b) of the first coil segment 20.

The joining surface 35a (35b) is a surface which extends in the circumferential direction CD and the axial direction AD and is joined with the joining surface 25a (25b) of the first coil segment 20 through laser welding.

The engaging surface 36a (36b) is a surface, which is orthogonal to the joining surface 35a (35b) and extends in the circumferential direction CD and the radial direction RD of the stator core 11, and is engaged with the engaging surface 26a (26h) of the first coil segment 20.

The abutting portions 24a (24h) and 34a (34h) of the first and second coil segments 20 and 30 include the joining surfaces 25a (25b) and 35a (35b) joined with each other and the engaging surfaces 26a (26b) and 36a (36b) which are orthogonal to the joining surfaces 25a (25b) and 35a (35h) and are engaged with each other, respectively. Therefore, the abutting portions can be joined in a state where the first coil segment 20 and the second coil segment 30 are positioned.

As illustrated in FIG. 7, the radial width L1 of the engaging surface 26a (26b) of the first coil segment 20 is shorter than the radial width L2 of the engaging surface 36a (36b) of the second coil segment 30. Accordingly, when the abutting portion 24a (24b) of the first coil segment 20 is overlapped with the abutting portion 34a (34h) of the second coil segment 30, the joining surfaces 25a (25b) and 35a (35b) can abut to each other reliably.

In the stator 10 formed as described above, when the end part 23a (23h) of the first coil segment 20 and the end part 33a (33b) of the second coil segment 30 are overlapped, and the engaging surface 26a (26b) is engaged with the engaging surface 36a (36b), the joining surface 25a (25b) and the joining surface 35a (35b) are brought into plane-contact with each other.

During laser welding, only by arranging a ring-shaped jig in the innermost diameter portion (the left side in FIG. 6) of the end parts 23a (23b) and 33a (33b) of the first and second coil segments 20 and 30 and pressing the end parts 23a (23h) and 33a (33h) of the first and second coil segments 20 and 30 in the outer radial direction (the right side in FIG. 6), the engaging surface 26a (26b) is engaged with the engaging surface 36a (36b), and the joining surface 25a (25b) is brought into contact with the joining surface 35a (35b) to be positioned. Incidentally, a certain degree of circumferential deviation between the end part 23a (23b) and the end part 33a (33b) does not substantially affect the performance of the stator 10.

In the state where the end parts 23a (23b) and 33a (33b) of the first and second coil segments 20 and 30 are pressed in the outer radial direction as described above, by a laser irradiation device (not illustrated), which is arranged on a side (the upper side in FIG. 7) opposite to the end surface 13a (13b) of the stator core 11 with the end part 23a (23b) of the first coil segment 20 and the end part 33a (33b) of the second coil segment 30 interposed therebetween, the boundary of the joining surface 25a (25b) and the joining surface 35a (35b) is irradiated with a laser beam toward the end surface 13a of the stator core 11, thereby welding the joining surface 25a (25b) and the joining surface 35a (35b).

In the stator 10, since the engaging surface 26a (26b) is orthogonal to the joining surface 25a (25b) and the engaging surface 36a (36b) is orthogonal to the joining surface 35a (35b), the laser beam which is irradiated from the laser irradiation device to pass through the boundary of the joining surface 25a (25b) and the joining surface 35a (35b) is blocked by the engaging surface 26a (26b) and does not reach the stator core 11 side over the abutting portions 24a (24b) and 34a (34b).

As described above, according to the stator 10, when the abutting portions 24a (24b) and 34a (34b) of the first coil segment 20 and the second coil segment 30 are laser-welded, it is possible to prevent that portions other than the abutting portions 24a (24b) and 34a (34b) which are welding target portions are irradiated with a laser beam. Therefore, the performance of the stator 10 can be prevented from deteriorating due to laser welding.

According to the stator 10, only by inserting the first coil segment 20 and the second coil segment 30 into the slot 12 of the stator core 11 and pressing the coil segments in the outer radial direction, the abutting portion 24a (24b) of the first coil segment 20 and the abutting portion 34a (34b) of the second coil segment 30 become overlapped in the radial direction RD.

For this reason, after the coil segment is attached to the stator core 11, the coil 15 can be completed only by performing laser welding. Accordingly, dedicated facilities for twisting and bending of the coil segment or the like are not required, and the manufacturing cost can be reduced.

According to the stator 10, the first coil segment 20 and the second coil segment 30 are formed through pressing working at the stages of components. Thus, a process after attaching the coil segment to the stator core 11 can be simplified, and the manufacturing cost can be reduced.

Next, the manufacturing procedure of the first and second coil segments will be described with reference to FIG. 8. The first coil segment 20 and the second coil segment 30 have the same manufacturing procedure. Thus, the following description will be given only about the first coil segment 20.

Figure 8:
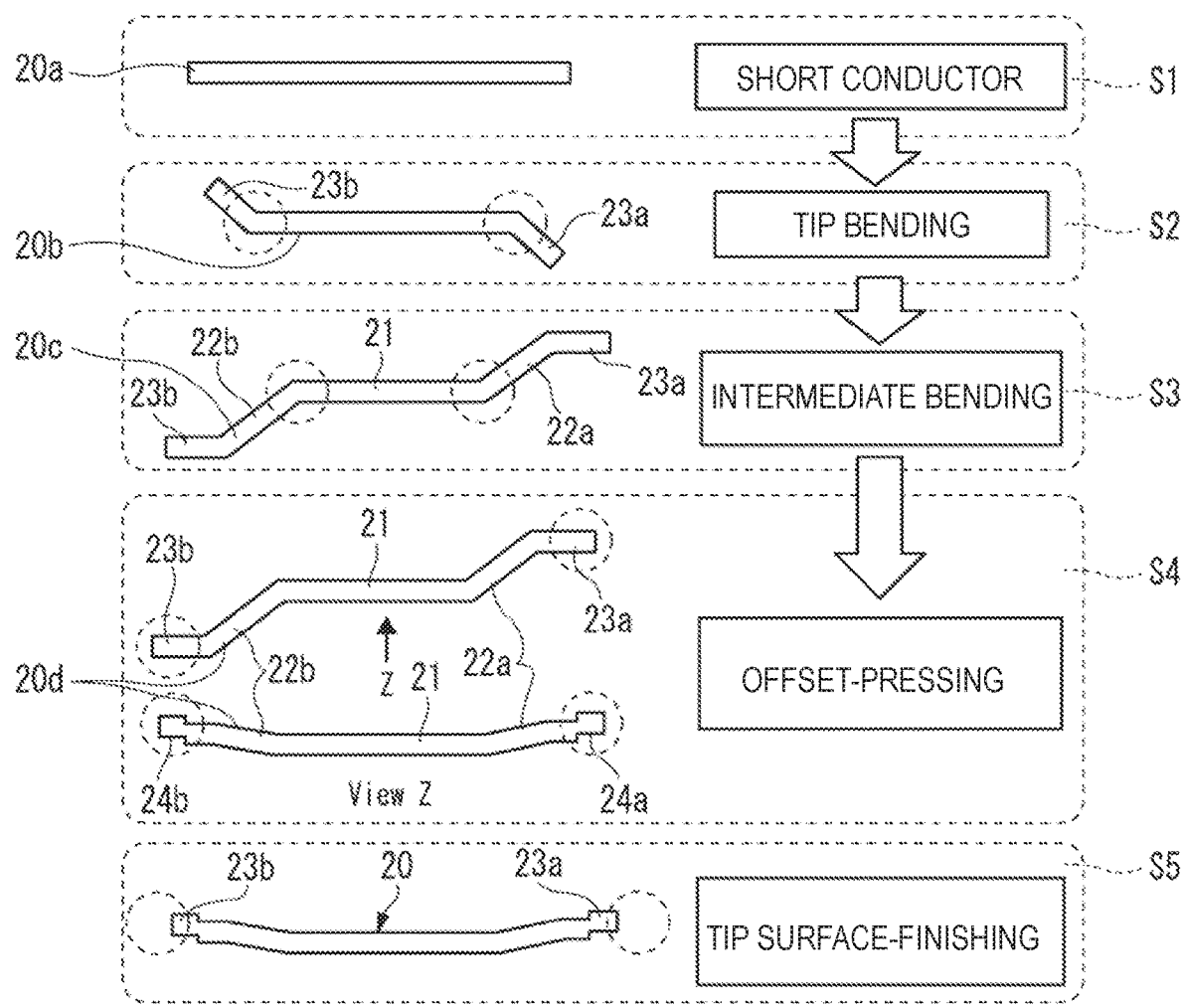
FIG. 8 is a manufacturing process view illustrating a manufacturing procedure of the first coil segment.

As illustrated in FIG. 8, as for the first coil segment 20, a material 20a is prepared by cutting a conductor having a rectangular cross section by a predetermined length (step S1).

Subsequently, both tip portions of the material 20a are bent in directions opposite to each other to prepare a first intermediate material 20h (step S2). Accordingly, the end parts 23a and 23b of the first coil segment 20 are formed.

The first intermediate material 20b is bent in directions opposite to each other on both sides of the insertion part 21 to prepare a second intermediate material 20c (step S3), By this forming, the first projection part 22a and the second projection part 22b are formed, and the end parts 23a and 23b are parallel to the insertion part 21.

Then, the end parts 23a and 23b is subjected to offset-pressing to form step parts (the joining surfaces 25a and 25b and the engaging surfaces 26a and 26b) which are the abutting portions 24a and 24b in the end parts 23a and 23b, thereby preparing a third intermediate material 20d (step S4).

Finally, surface-finishing is performed on the end surfaces of the end parts 23a and 23b (step S5), By performing the surface-finishing finally, dimensional change caused by bending and stretching of the material 20a is absorbed, and the work of the next process is facilitated.

The above-described embodiment may be modified or improved appropriately, For example, in the above-described embodiment, the abutting portions 24a and 34a are formed as the recessed portion and the convex portion formed toward the outer diameter side of the stator core 11. However, on the contrary, the abutting portions may be formed as a convex portion and a recessed portion formed toward the inner diameter side of the stator core 11.

At least the following items are described in this specification. Incidentally, the parentheses indicate the corresponding components or the like in the embodiment, but the invention is not limited thereto.

(1) A stator (a stator 10) of an electric rotary machine including:

a stator core (a stator core 11);

a coil (a coil 15) including a plurality of coil segments which are inserted into each of plural slots (slots 12) formed in the stator core and project from the plural slots to an outside in an axial direction (an axial direction AD) of the stator core, in which the plurality of coil segments include a plurality of first coil segments (first coil segments 20) and a plurality of second coil segments (second coil segments 30), the first coil segment includes an insertion part (an insertion part 21) inserted into the slot and a projection part (a projection part 22a) which projects to the outside in the axial direction compared to an end surface (an end surface 13a) in the axial direction of the stator core, the second coil segment includes an insertion part (an insertion part 31) inserted into the slot and a projection part (a projection part 32a) which projects to the outside in the axial direction compared to the end surface, an end part (an end part 23a) of the projection part of the first coil segment is joined with an end part (an end part 33a) of the projection part of the second coil segment through laser welding in a state of abutting to the end part of the projection part of the second coil segment, and abutting portions (abutting portions 24a and 34a) abutting to each other between the projection part of the first coil segment and the projection part of the second coil segment include joining surfaces (joining surfaces 25a and 35a) joined with each other and engaging surfaces (engaging surfaces 26a and 36a) engaged with each other and orthogonal to the joining surfaces.

According to (1), since the abutting portions abutting to each other between the projection part of the first coil segment and the projection part of the second coil segment include the joining surfaces joined with each other and the engaging surfaces engaged with each other and orthogonal to the joining surfaces, the first coil segment and the second coil segment can be joined in a positioned state. In addition, since the engaging surface of any one of the first coil segment and the second coil segment functions as a retaining part of a laser beam at the time of laser welding the joining surfaces, it is possible to avoid the adverse effect of the laser beam.

(2) The stator of the electric rotary machine according to (1), in which the end part of the projection part of the first coil segment and the end part of the projection part of the second coil segment are joined in a state of being overlapped with each other in a radial direction (a radial direction RD) of the stator core, a circumferential width (a circumferential width W) is larger than a radial width (a radial width H) in the first coil segment and the second coil segment, the joining surfaces are surfaces which extend in a circumferential direction (a circumferential direction CD) and the axial direction of the stator core, and the engaging surfaces are surfaces which extend in the circumferential direction and the radial direction of the stator core.

According to (2), in the first coil segment and the second coil segment of which the circumferential width is larger than the radial width, the joining surfaces are the surfaces which extend in the circumferential direction and the axial direction of the stator core, so that the joining area can be secured widely. In addition, the engaging surfaces are the surfaces which extend in the circumferential direction and the radial direction of the stator core, so that the engaging surfaces can be secured widely.

(3) The stator of the electric rotary machine according to (2), in which the joining surface and the engaging surface of the first coil segment form a recessed portion formed on a surface facing the second coil segment.

the joining surface and the engaging surface of the second coil segment form a convex portion formed on a surface facing the first coil segment, and a radial width (a radial width L1) of the engaging surface of the first coil segment is shorter than a radial width (a radial width L2) of the engaging surface of the second coil segment.

According to (3), the radial width of the engaging surface of the first coil segment is shorter than the radial width of the engaging surface of the second coil segment, so that the joining surfaces can abut to each other reliably.

(4) The stator of the electric rotary machine according to (3), in which the second coil segment is joined with the first coil segment in a pressed state.

According to (4), the second coil segment is pressed to the first coil segment, so that the engaging surfaces are engaged with each other and the joining surfaces are brought into contact with each other. Thus, joining processing can be performed easily.

What is claimed is:

1. A stator of an electric rotary machine comprising:
   a stator core;
   a coil including a plurality of coil segments which are inserted into each of plural slots formed in the stator core and project from the plural slots to an outside in an axial direction of the stator core, wherein
   the plurality of coil segments include a plurality of first coil segments and a plurality of second coil segments,
   the first coil segment includes an insertion part inserted into the slot and a projection part which projects to the outside in the axial direction compared to an end surface in the axial direction of the stator core,
   the second coil segment includes an insertion part inserted into the slot and a projection part which projects to the outside in the axial direction compared to the end surface,
   an end part of the projection part of the first coil segment is joined with an end part of the projection part of the second coil segment through laser welding in a state of abutting to the end part of the projection part of the second coil segment,
   abutting portions abutting to each other between the projection part of the first coil segment and the projection part of the second coil segment include joining surfaces joined with each other and engaging surfaces engaged with each other and orthogonal to the joining surfaces, and
   the engaging surfaces are surfaces which extend in the circumferential direction and the radial direction of the stator core.

2. The stator of the electric rotary machine according to claim 1, wherein
   the end part of the projection part of the first coil segment and the end part of the projection part of the second coil segment are joined in a state of being overlapped with each other in a radial direction of the stator core,
   a circumferential width is larger than a radial width in the first coil segment and the second coil segment, and
   the joining surfaces are surfaces which extend in a circumferential direction and the axial direction of the stator core.

3. The stator of the electric rotary machine according to claim 2, wherein
   the joining surface and the engaging surface of the first coil segment form a recessed portion formed on a surface facing the second coil segment,
   the joining surface and the engaging surface of the second coil segment form a convex portion formed on a surface facing the first coil segment, and
   a radial width of the engaging surface of the first coil segment is shorter than a radial width of the engaging surface of the second coil segment.

4. The stator of the electric rotary machine according to claim 3, wherein the second coil segment is joined with the first coil segment in a pressed state.

5. The stator of the electric rotary machine according to claim 1, wherein
   a radial width of the engaging surface of the first coil segment is shorter than a radial width of the engaging surface of the second coil segment.

* * * * *